(12) United States Patent
Milner

(10) Patent No.: US 9,260,977 B2
(45) Date of Patent: Feb. 16, 2016

(54) BALANCE CORRECTION WEIGHT PROVIDING CONSTANT MASS

(75) Inventor: Glynn Milner, Fiskerton (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 522 days.

(21) Appl. No.: 13/704,294

(22) PCT Filed: May 31, 2011

(86) PCT No.: PCT/EP2011/058905
§ 371 (c)(1),
(2), (4) Date: Jan. 23, 2013

(87) PCT Pub. No.: WO2011/157547
PCT Pub. Date: Dec. 22, 2011

(65) Prior Publication Data
US 2013/0236292 A1    Sep. 12, 2013

(30) Foreign Application Priority Data

Jun. 17, 2010  (EP) .................................... 10166295

(51) Int. Cl.
| | |
|---|---|
| F16F 15/32 | (2006.01) |
| F01D 5/02 | (2006.01) |
| F01D 25/04 | (2006.01) |
| F16F 15/34 | (2006.01) |
| B23K 35/02 | (2006.01) |
| F01D 1/24 | (2006.01) |
| F01D 5/00 | (2006.01) |
| B23K 26/32 | (2014.01) |

(52) U.S. Cl.
CPC .............. *F01D 25/04* (2013.01); *B23K 26/32* (2013.01); *B23K 26/342* (2015.10); *B23K 35/0244* (2013.01); *F01D 1/24* (2013.01); *F01D 5/005* (2013.01); *F16F 15/34* (2013.01); *B23K 2201/001* (2013.01); *B23K 2203/08* (2013.01); *F01D 5/027* (2013.01); *F05B 2260/966* (2013.01); *F05D 2260/30* (2013.01); *Y10T 29/4932* (2015.01)

(58) Field of Classification Search
None
See application file for complete search history.

(56) References Cited

U.S. PATENT DOCUMENTS

| | | | |
|---|---|---|---|
| 1,645,323 A | 10/1927 | Griswold | |
| 3,736,811 A | 6/1973 | Neary | |
| 3,916,495 A | 11/1975 | Brozenske | |
| 4,842,485 A | 6/1989 | Barber | |
| 5,018,943 A * | 5/1991 | Corsmeier et al. | ............ 416/144 |

(Continued)

FOREIGN PATENT DOCUMENTS

| | | |
|---|---|---|
| CN | 1035341 A | 9/1989 |
| EP | 1052424 A2 | 11/2000 |

(Continued)

*Primary Examiner* — Dwayne J White
*Assistant Examiner* — Justin Seabe

(57) ABSTRACT

A system is provided for balancing a movable turbine part of a turbine or of a compressor. The system includes a balancing weight element with a first hole and a second hole and a fixing element. The first hole and the second hole are formed in such a manner that the fixing element is detachably insertable in either the first hole or the second hole. The first hole is formed in such a manner that the inserted fixing element in the first hole detachably couples the balancing weight element to the movable turbine part in a spatially fixed position. The second hole is formed in such a manner that the fixing element is receivable in the second hole.

11 Claims, 2 Drawing Sheets

(56) References Cited

U.S. PATENT DOCUMENTS

| | | | |
|---|---|---|---|
| 5,285,700 | A | 2/1994 | Lau |
| 5,545,010 | A | 8/1996 | Leuven |
| 6,279,420 | B1 | 8/2001 | Alexander |
| 6,640,704 | B2 * | 11/2003 | Siebolds et al. ............. 101/216 |
| 8,177,487 | B2 * | 5/2012 | Koza et al. .................... 415/119 |
| 2002/0028141 | A1 | 3/2002 | Palmer |
| 2002/0029653 | A1 | 3/2002 | Knorowski |
| 2006/0053882 | A1 | 3/2006 | Adelmann |

FOREIGN PATENT DOCUMENTS

| | | |
|---|---|---|
| EP | 1052424 B1 | 6/2005 |
| EP | 2169181 A2 | 3/2010 |
| FR | 2630496 A1 | 10/1989 |
| JP | 55072937 A | 6/1980 |
| JP | 5572937 B2 | 8/2014 |
| RU | 2018037 C1 | 8/1994 |

* cited by examiner

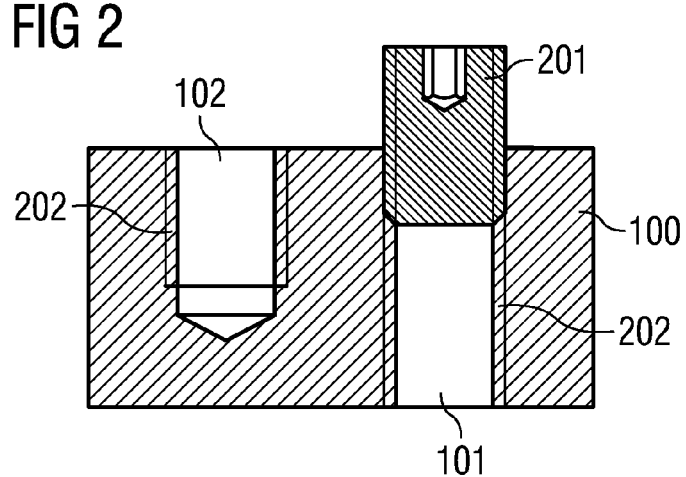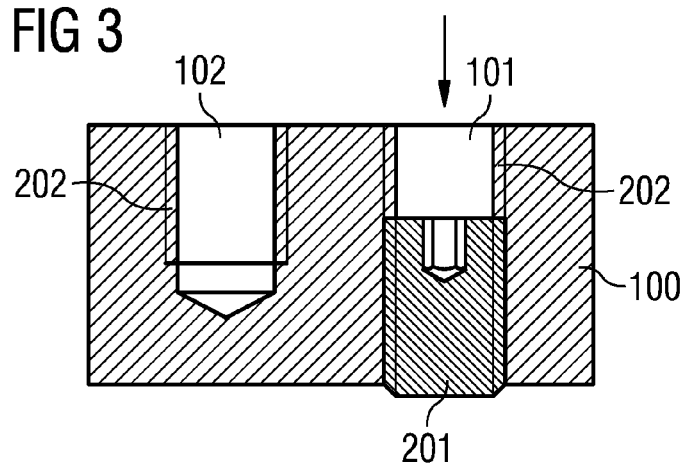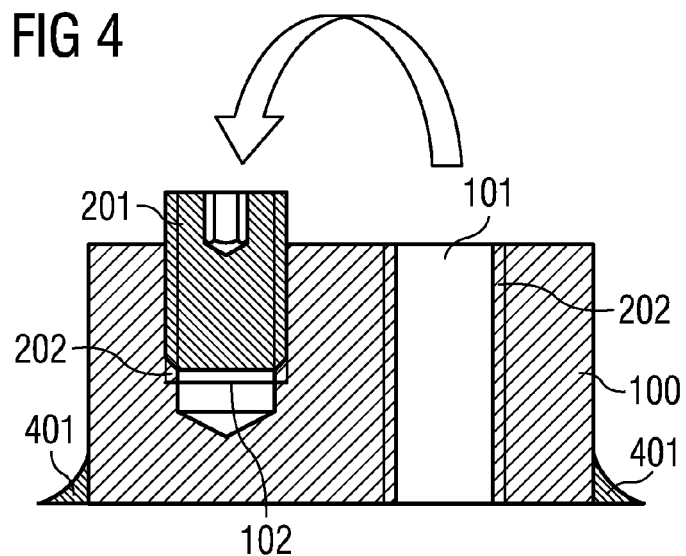

BALANCE CORRECTION WEIGHT PROVIDING CONSTANT MASS

CROSS REFERENCE TO RELATED APPLICATIONS

This application is the US National Stage of International Application No. PCT/EP2011/058905, filed May 31, 2011 and claims the benefit thereof. The International Application claims the benefits of European application No. 10166295.5 EP filed Jun. 17, 2010. All of the applications are incorporated by reference herein in their entirety.

FIELD OF INVENTION

The present invention relates to a system for balancing a movable turbine part of a turbine or of a compressor, to a movable turbine part of a turbine or of a compressor as well as to a method of balancing a movable turbine part of a turbine or of a compressor.

ART BACKGROUND

In turbines or compressors, in particular in gas turbines, movable turbine parts, such as rotor blades in a compressor stage or in a turbine stage, rotate with a high rotary speed around a turbine shaft. In order to prevent an unbalance during rotation, balancing weights have to be placed to the movable turbine parts for balancing the movable parts. An unbalance of the movable turbine parts leads to damages of the turbine, e.g. in the bearings, and thus to higher maintenance costs.

In order to balance the movable parts of the turbine, the balance weights are fixed to the movable turbine parts in a balanced position. In the balance position, the balancing weights are permanently fixed, so that an undesired displacement of the balancing weights during operation of the turbine is prevented.

Conventional designs of movable turbine parts, such as turbine discs, comprise a number of holes that are equispaced axially or radially in the turbine disc or in a shaft of a turbine, wherein into the holes fixing elements for locking the balance weights are insertable.

U.S. Pat. No. 6,640,704 B2 discloses a device for providing a balancing of rotating bodies, in particular for balancing a drum of a roller of a printing plate exposure device. A weight element is placed in a T-Slot of a movable part and is fixed by a pin in order to prevent a further displacement.

EP 1 052 424 B1 discloses an apparatus for balancing turbine rotors. A balancing weight is fixed to a movable turbine part and is fixed by a threaded fastener that is screwed in a threaded hole of the balancing weight element.

U.S. Pat. No. 4,842,485 discloses a movable turbine part, such as a turbine rotor, wherein an expandable weight assembly is fixed to the movable part. An expander screw expands the cross-section of the weight assembly in order to press the weight assembly at a desired position in a groove of the movable part.

U.S. Pat. No. 3,736,811 discloses a balance weight attachment for a movable part of turbines. A split weight construction comprises a body portion capable of being mounted in a groove of the movable part. The body portion comprises a threaded oblique passage way, so that a screw may pass there through so as to bear the body part against the other side of the groove, when the screw is tightened. Thus, the body portion is fixed at a desired position of the movable part.

U.S. Pat. No. 5,285,700 A discloses a method for balancing a rotor portion of a gas turbine engine. A bolt for connecting two movable parts of the turbine carries a set screw which comprises a balancing weight in order to balance the movable parts.

US 2006/0053882 A1 discloses an apparatus for balancing a gas turbine engine. Balancing washers are attached to a bolt that connects movable turbine parts in order to balance the movable parts.

US 2002/0029653 A1 discloses a balancing weight for a rotary component in a turbo machinery. A balancing weight is attacked to a groove of the rotary component. By a central opening in the balancing weight a tool for controlling, i.e. fixing and adjusting the balancing weight, is receivable.

U.S. Pat. No. 3,916,495 discloses means for balancing a gas turbine engine, with which two movable parts of a turbine may be removed and replaced without performing an additional balancing operation. A tie bolt fixes the two movable turbine parts, wherein the tie bolt comprises balancing washers in order to balance the movable turbine parts.

SUMMARY OF THE INVENTION

It may be an object of the present invention to provide a proper and easier balancing of movable turbine parts.

This object may be solved by a system for balance a movable turbine part of a turbine or of a compressor, by a movable turbine part of the turbine or of a compressor and by a method of balancing the movable turbine part of the turbine or of a compressor according to the independent claims.

According to a first aspect of the present invention, a system for balancing a movable turbine part of a turbine or of a compressor, in particular of a gas turbine, is presented. The system comprises a balancing weight element with a first hole and a second hole. Moreover, the system comprises a fixing element. The first hole and the second hole are formed in such a manner that the fixing element is detachably insertable in either the first hole or the second hole. The first hole is formed in such a manner, that the inserted fixing element in the first hole detachably couples the balancing weight element to the movable turbine part in a spatially fixed position. The second hole is particularly formed in such a manner that the fixing element is receivable in the second hole, when the balancing weight element is non-detachably fixed to the movable turbine part in the spatially fixed position.

According to a further aspect of the present invention, a movable turbine part of a turbine or of a compressor is presented, wherein the movable turbine part comprises a coupling element. The coupling element is formed in such a manner that the balancing weight element of the above-described system is coupleable to the movable turbine part in either a detachable manner or a non-detachable manner.

According to a further aspect of the invention, a method of balancing a movable turbine part of a turbine or of a compressor is presented. A balancing weight element is positioned at a spatially fixed position of the movable turbine part. A balancing weight element is detachably coupled to the movable turbine part at the spatially fixed position by inserting a fixing element in a hole of the movable turbine part. Furthermore, it is tested, whether the movable turbine part is balanced. If the movable turbine part is balanced, the balancing weight element is non-detachably fixed at the spatially fixed position to the movable turbine part. The fixing element is inserted in a second hole of the balancing weight element, when the balancing weight element is non-detachably fixed in the spatially fixed position.

The term "detachably insertable" denotes a receiving of the fixing element in the first hole or the second hole in a detachable manner. The fixing element is detachable without destroying or deforming the fixing element in the first hole. The fixing element may be detachably insertable in either the first or the second hole in a repeatable manner without destroying the fixing element or the first or the second hole when detaching the fixing element.

The term "non-detachably fixed" denotes a fixation of the balancing weight element to the movable turbine part in a non-detachable manner, e.g. by non-detachable further fixing elements. The balancing weight element which is non-detachable fixed is only detachable from the movable turbine part by e.g. deforming or replacing the further fixing elements or by deforming the balancing weight element or the movable turbine part.

The term "movable turbine part" denotes a moving or rotating part of the turbine or the compressor. In particular, the movable turbine part may present a turbine disc or compressor disc. In larger gas turbines the presented balancing system is applicable to the individual compressor discs of the gas turbine.

By the present invention it is possible to remain the balancing weight element adjustable by the fixing element until the final balanced position has been found. No further fixation is thereby necessary during the balancing procedure. When the balanced position is found, the balancing weight element is finally secured non-detachably in particular in a mechanical manner, e.g. by peening. Furthermore, the fixing element is safely stored in the second hole after the final non-detachable fixation of the balancing weight element. When the fixing element is received in the second hole, the fixing element may not be used for fixing the movable turbine part with the balancing weight element. Because the fixing element is still attached to the balancing weight element, the overall weight of the balancing system remains unchanged between the temporary fixed position and the finally secured, non-detachable position of the balancing weight element.

Thus, by the system for balancing the movable turbine part it is on the one side possible to provide a flexible adjustable fixing of the balancing weight element and on the other side a permanent fixation of the balancing weight element without amending the constant overall weight of the system during the complete balancing procedure. This may lead to the effect, that the weight of the balancing weight element after finding the balanced position must not be changed any more. In other words, when the balanced position has been found, no changes in the weight distribution of the balanced rotor part comprising the balancing system occur. Thus, a readjustment of the balance of the movable turbine part after permanently fixing the balancing weight element may not be necessary and thus a proper balancing method for a movable turbine part is achieved.

According to a further exemplary embodiment, the system comprises a further fixing element. The balancing weight element is fixable in a non-detachable manner in the spatially fixed position by the further fixing element.

According to a further exemplary embodiment of the present invention, the further fixing element for fixing the balancing weight element in a non-detachably manner is insertable in the first hole.

According to a further exemplary embodiment of the present invention, the further fixing element is selected from one of the group consisting of bolts, welding points and nails.

According to a further aspect of the present invention, the first hole is a through-hole and the second hole is a blind hole.

According to a further exemplary embodiment of the present invention, the fixing element comprises a screw, in particular a grub screw, and the first hole and/or the second hole comprises a thread. Thus, in an easy manner, the fixing element may be screwed in the first hole in order to clamp the balancing weight element with the movable turbine part. When the desired balanced position is found, the fixing element is screwed in the first hole for temporary and detachably fixing the balancing weight element.

According to a further exemplary embodiment, the balancing weight element is formed in such a manner that the balancing weight element is slideably coupleable to a coupling element of the movable turbine part.

According to a further exemplary embodiment, the balancing weight element comprises a protrusion for being slideably coupleable inside the coupling element, wherein the coupling element comprises a groove. The coupling element may also form a protrusion and the balancing weight element comprises a groove that is capable of receiving the protrusion.

According to a further exemplary embodiment, the balancing weight element is formed in such a manner that the balancing weight element forms a dove tail connection with the coupling element. The balancing weight element therefore comprises the groove with a dove tail shaped cross section and the coupling element comprises a dove tail profile that fits in the groove. On the other side, the coupling element comprises the groove with the dove tail shaped cross section and the balancing weight element comprises the dove tail profile that fits in the groove. Thus, the balancing weight element is slideably coupleable with the movable turbine part.

The protrusion and the corresponding groove are formed for example with a straight, non-curved shape, that extends parallel, tangential or in a radial direction to a shaft of the turbine to which the movable turbine part is coupled. Moreover, the protrusion or the corresponding groove of the balancing weight element may comprise a curved shape, wherein the curved shape is aligned e.g. to a circumferential direction with respect to the shaft of the wind turbine.

Moreover, the system for balancing the movable turbine part may comprise a plurality of balancing weight elements with assigned fixing elements. Moreover, the balancing weight element may further comprise a plurality of first holes and a plurality of second holes that are adapted for receiving assigned fixing elements. Thus, a proper fixation of the balancing weight element is achieved.

According to a further aspect of the method, the non-detachably fixing of the balancing weight element comprises peening, welding, bracing and/or adhesive bonding. In other words, the non-detachably fixing of the balancing weight element comprises further fixing elements that permanently fixes the balancing weight element to the movable turbine part.

By the present invention, movable turbine parts, such as compressor turbine disks, may be balanced by the balancing weight element, wherein e.g. the compressor turbine disk incorporates a dove tail shape balancing weight element that corresponds to a shaped circumferential groove of the movable turbine part in order to provide a slidable coupling. By the present invention, the balancing weight element may be finally secured by a mechanical connection, e.g. by peening, wherein, until the final balanced position has been proven, an adjustable temporarily fixing of the balancing weight element is possible. E.g. for the fixing element a screw may be used as a temporary means of fixation. In many conventional balancing systems, the temporary fixing means has to be removed before finally fixing the balancing weight element in the balanced position, which will affect the balance correction, i.e. the overall weight of the balancing weight element. Thus, by the present invention, after the final position has been proven, the temporary detachable fixing element, such as the screw, is removed from the first hole and is re-positioned and locked into the second hole, so that the overall mass of the balancing weight is kept unchanged and the amount of balance correction is unaffected. The fixing element is re-positioned and locked into the second hole either in a detachable or non-detachable manner. Thus, this has the advantage that unnecessary damage or distortion to the movable turbine part or the balancing weight element that is caused e.g. by temporary peening prior the final position has been established, may be avoided.

It has to be noted that embodiments of the invention have been described with reference to different subject matters.

In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 2-FIG. 4 show schematical views of the balancing weight element according to an exemplary embodiment of the present invention.

DETAILED DESCRIPTION

Figure 1:
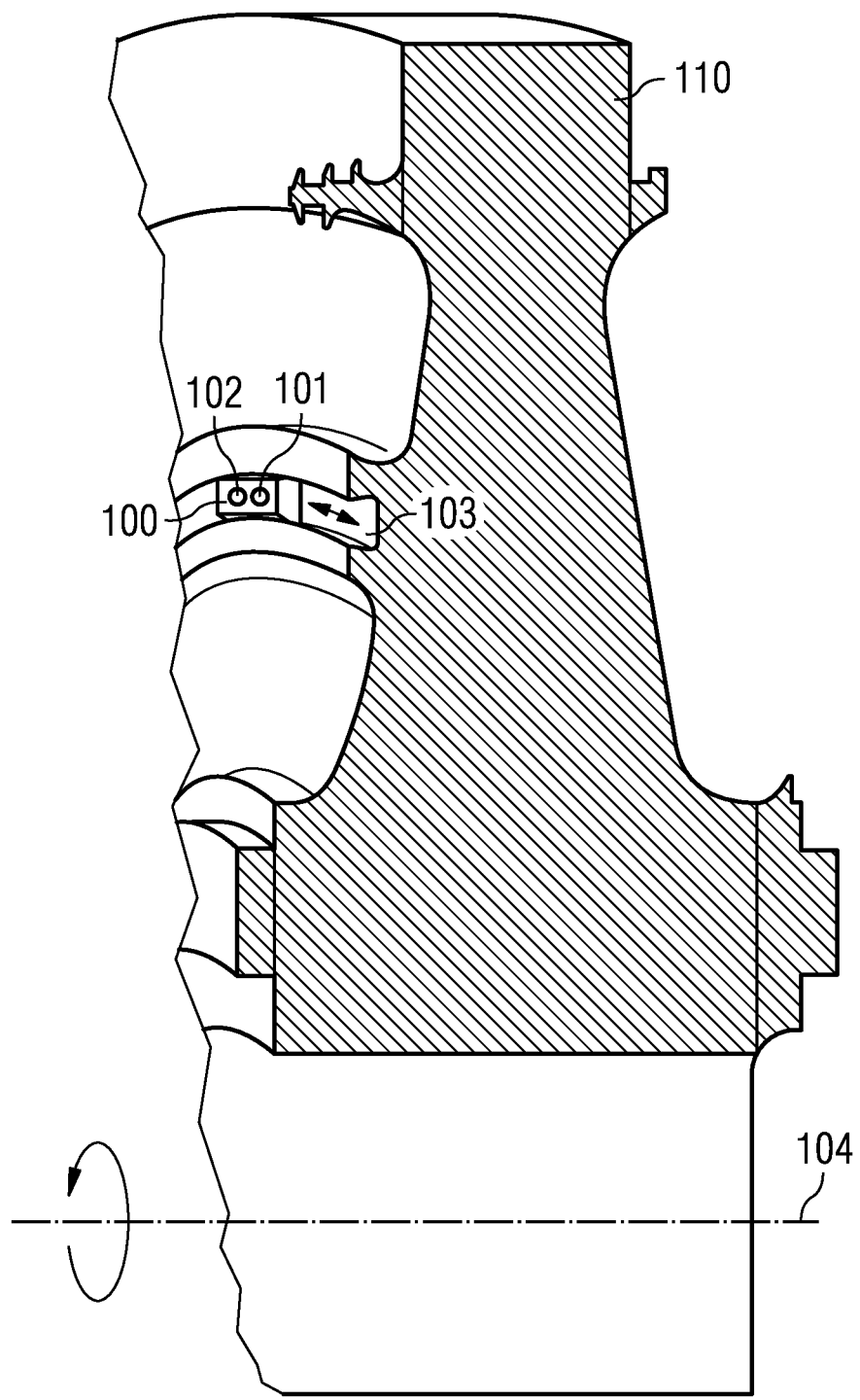
FIG. 1 shows a schematical view of a compressor turbine disk comprising a balancing system according to an exemplary embodiment of the present invention.

The illustrations in the drawings are schematical. It is noted that in different figures, similar or identical elements are provided with the same reference signs.

FIG. 1 shows the system for balancing a movable turbine part 110 of a turbine. The system comprises a balancing weight element 100 with a first hole 101 and a second hole 102. Moreover, the balancing weight element 100 comprises a fixing element 201 (see FIG. 2). The first hole 101 and the second hole 102 are formed in such a manner that the fixing element 201 is detachably insertable in either the first hole 101 or the second hole 102. The first hole 101 is formed in such a manner that the inserted fixing element 105 in the first hole 101 detachably couples the balancing weight element 100 to the movable turbine part 110 in a spatially fixed position.

The second hole 102 is formed in such a manner that the fixing element 201 is receivable in the second hole 102, when the balancing weight element 100 is non-detachably fixed to the movable turbine part 110 in the spatially fixed and balanced position.

In particular, the movable turbine part 110 is rotatable around a shaft 104 of a turbine. The movable turbine part 110 is for instance a compressor turbine disk. The movable turbine part 110 may comprise a protrusion or, as shown in FIG. 1, a groove 103 into which the balancing weight element 100 is slideably coupleable by a corresponding protrusion of the balancing weight element 100. The groove 103 may be formed in a lateral, axial, tangential or radial direction with respect to the shaft 104 and a rotary axis of the movable turbine part 110 respectively. As shown in FIG. 1, the groove 103 is formed in a circumferential direction with respect to the shaft 104 or rather the rotary axis of the movable turbine part 110.

As shown in FIG. 1, the balancing weight element 100 forms a dove tail shaped protrusion that fits into a corresponding dove tail formed groove 103. Thus, by the exemplary embodiment shown in FIG. 1, the balancing weight element 100 is slidable around the circumferential direction of the shaft 104.

FIG. 2 shows a more detailed view of an exemplary embodiment of the balancing weight element 100. The balancing weight element 100 comprises the first hole 101 and the second hole 102. In FIG. 2, the fixing element 201 is shown that may be for instance a screw, i.e. a grub screw. The first hole 101 and/or the second hole 102 comprises a thread 202 that corresponds to a thread of the fixing element 201. Thus, the fixing element 201 is detachably fixable by screwing to the first hole 101 or the second hole 102.

FIG. 3 shows the balancing weight element 100, wherein the balancing weight element 100 is temporarily fixed by the fixing element 201. As shown in FIG. 3, the first hole 101 is a through-hole in which the fixing element 201 is screwed in the direction as indicated by the arrow. The fixing element 201 may thereby fix the balancing weight element 100 temporarily. Thus, the balancing weight element 100 is slideably inside the groove, when the movable turbine part 110 is not balanced sufficiently. In other words, the balancing weight element 100 is temporarily secured and slidable to a balanced position. The fixing element 201 in the first hole 101 presses the balancing weight element 100 to the movable turbine part 110 in order to provide a temporary fixation e.g. by a clamping connection.

FIG. 4 shows the balancing weight element 100 in a permanently fixed manner. When the final balanced position of the balancing weight element 100 is found, the fixing element 201 is inserted to the second hole 102 (e.g. a blind hole). The balancing weight element 100 is permanently mechanically locked into place by the further fixing element 401, such as bolts, welding points or nails. Additionally or alternatively to the further fixing element 401, the further fixing is in particular provided by peening, welding, bracing and/or adhesive bonding. The fixing element 201 may be detachably (e.g. by screwing into a thread of the second hole 102) or non-detachably (e.g. by hammering the screw into the second hole 102 for providing a press fit connection) inserted and stored in the second hole 102.

Because the screw is re-positioned and locked into the second hole 102, the mass and overall weight of the balancing weight element 100 is not changed between the temporary detachable and the permanent non-detachable fixing and thus the balance and balance correction is unaffected.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A system for balancing a movable turbine part of a turbine or of a compressor, the system comprising
   a balancing weight element with a first hole and a second hole, and
   a single detachable fixing element,
   wherein the first hole and the second hole are formed in such a manner that the single detachable fixing element is detachably insertable in either the first hole or the second hole,
   wherein the first hole is formed in such a manner that the inserted fixing element in the first hole detachably couples the balancing weight element to the movable turbine part in a spatially fixed position,
   wherein the second hole is formed in such a manner that the fixing element is receivable in the second hole, and
   wherein when the balancing weight element has been non-detachably secured to the movable part, said fixing element is received within the second hole,
   whereby the over-all weight of the system remains unchanged between a detachably spatially fixed position and a non-detachably secured position of the balancing weight element.

2. The system of claim 1, further comprising
   a permanent fixing element,
   wherein the balancing weight element is fixable in a non-detachably manner in the spatially fixed position by the permanent fixing element.

3. The system of claim 2, wherein the permanent fixing element is insertable in the first hole.

4. The system of claim 3, wherein the permanent fixing element is selected from the group consisting of bolts, welding points and nails.

5. The system of claim 1, wherein the first hole is a through hole and the second hole is a blind hole.

6. The system of claim 1,
   wherein the single detachable fixing element comprises a screw, and
   wherein the first hole and/or the second hole comprise a thread.

7. The system of claim 1, wherein the balancing weight element is formed in such a manner that the balancing weight element is slideably coupleable to a coupling element of the movable turbine part.

8. The system of claim 7, wherein the balancing weight element comprises a protrusion for being slideably coupleable inside the coupling element, wherein the coupling element comprises a groove.

9. The system of claim 7, wherein the balancing weight element is formed in such a manner that the balancing weight element forms a dove tail connection with the coupling element.

10. A method of balancing a movable turbine part of a turbine or of a compressor, the method comprising
    positioning a balancing weight element at a spatially fixed position of the movable turbine part,
    detachably coupling the balancing weight element to the movable turbine part at the spatially fixed position by inserting a fixing element in a first hole of the movable turbine part,
    testing whether the movable turbine part is balanced, and if the movable turbine part is balanced,
    non-detachably fixing the balancing weight element at the spatially fixed position to the movable turbine part, and
    inserting the fixing element in a second hole of the balancing weight element, when the balancing weight element is non-detachably fixed in the spatially fixed position.

11. The method of claim 10, wherein the non-detachably fixing of the balancing weight element comprises peening, welding, brazing and/or adhesive bonding.

* * * * *